Dec. 19, 1950  B. C. FISHER  2,534,860
COMPRESSION RELIEF FOR INTERNAL-COMBUSTION ENGINES
Filed Feb. 1, 1946  3 Sheets—Sheet 1
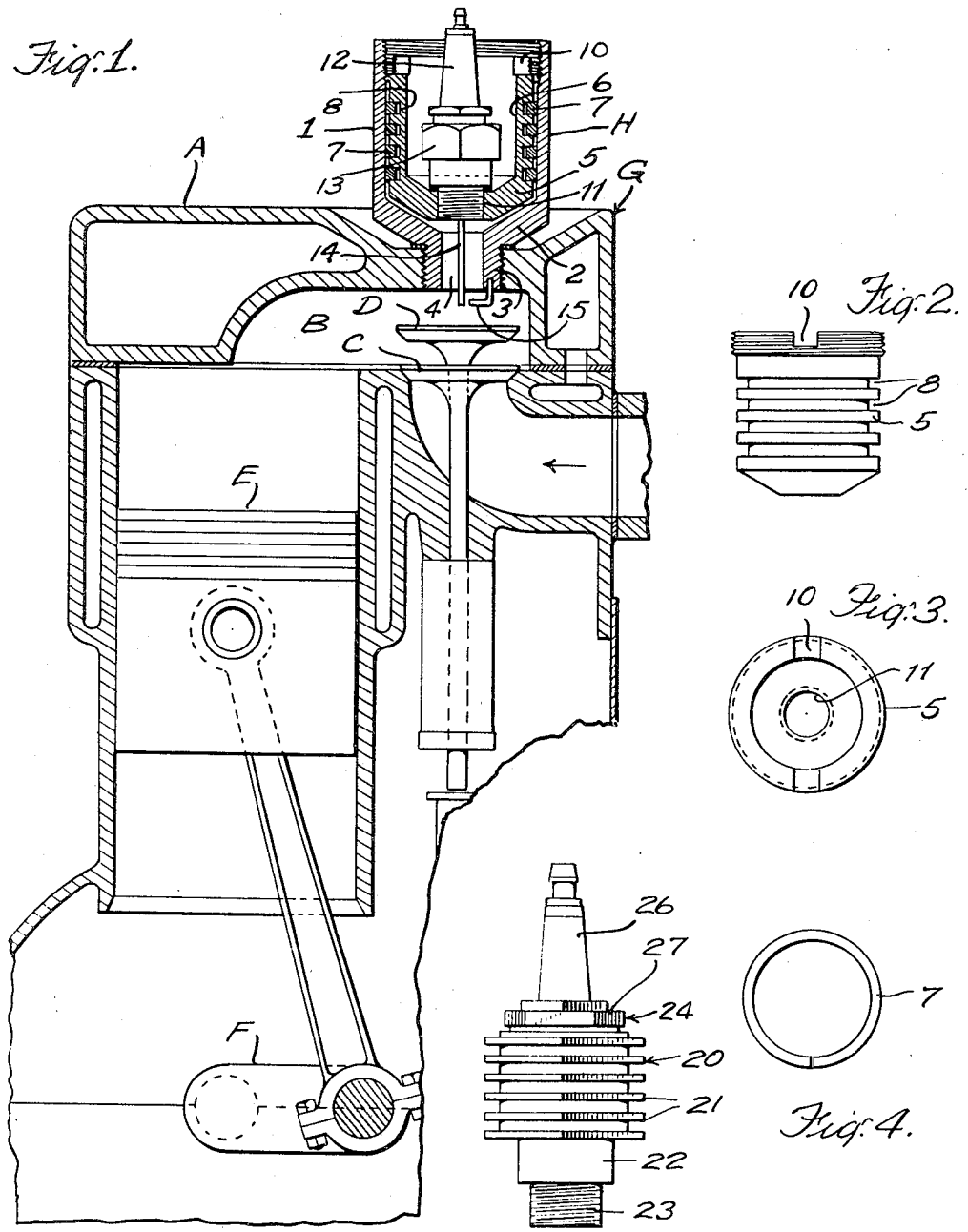
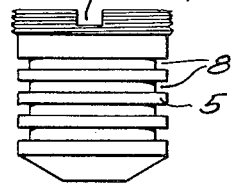
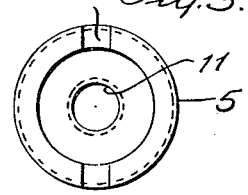
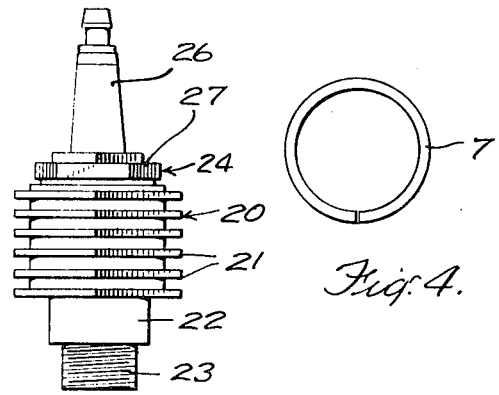
INVENTOR
BERNARD C. FISHER
BY
Frederic P. Warfield
ATTORNEY Dec. 19, 1950         B. C. FISHER         2,534,860
COMPRESSION RELIEF FOR INTERNAL-COMBUSTION ENGINES
Filed Feb. 1, 1946         3 Sheets-Sheet 2
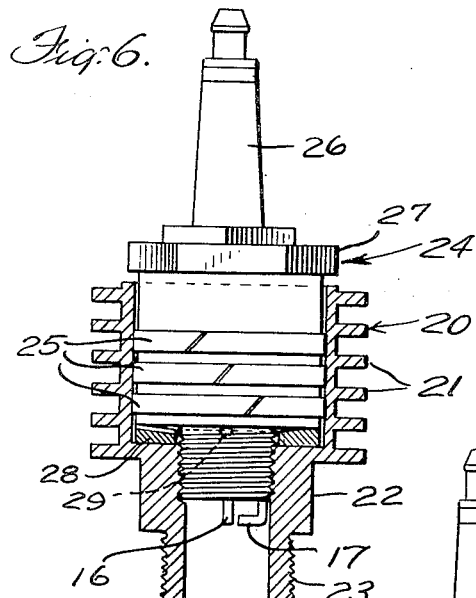
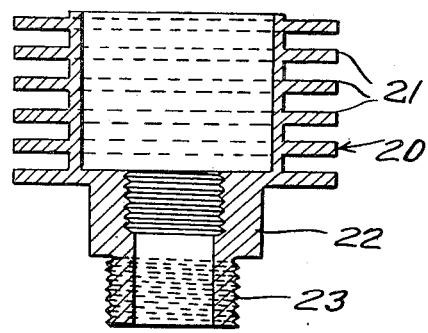
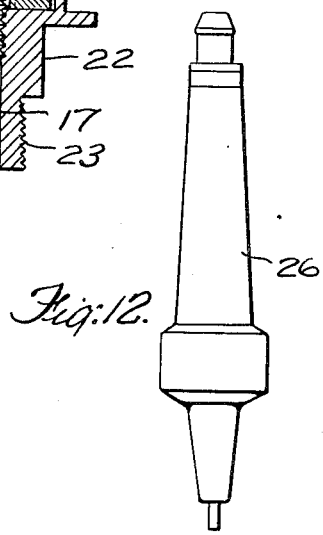
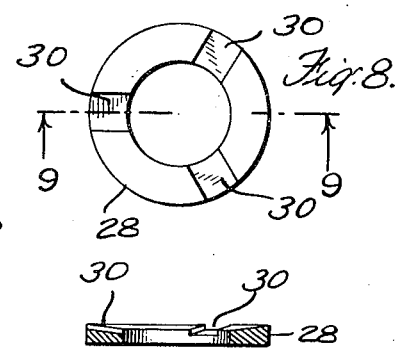
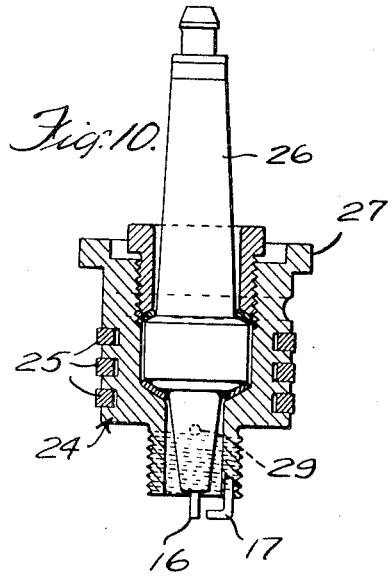
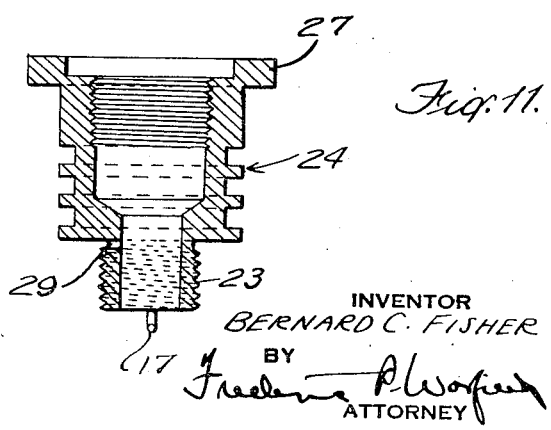
INVENTOR
BERNARD C. FISHER
BY
ATTORNEY Dec. 19, 1950 B. C. FISHER 2,534,860
COMPRESSION RELIEF FOR INTERNAL-COMBUSTION ENGINES
Filed Feb. 1, 1946 3 Sheets-Sheet 3

INVENTOR
BERNARD C. FISHER
BY
Frederic P. Worfield
ATTORNEY

Patented Dec. 19, 1950

2,534,860

UNITED STATES PATENT OFFICE 2,534,860

COMPRESSION RELIEF FOR INTERNAL-COMBUSTION ENGINES

Bernard C. Fisher, Jersey City, N. J.

Application February 1, 1946, Serial No. 644,859

17 Claims. (Cl. 123—182)

This invention relates to internal combustion engines, and more specifically to ignition units for such engines.

One of its objects is to provide for complete, rapid and practically instantaneous combustion of the fuel used in the engine, whether that fuel be gasoline, kerosene, alcohol or other fuel.

A second object is to provide a construction whereby the compression ratio may be substantially increased with the attendant advantages of a high compression ratio which heretofore have not been fully attained and not attained at all with ordinary fuel.

A further object is to provide a construction which will minimize and substantially relieve the detonation or knock caused by too great a compression of the fuel charge.

A further object is to provide an auxiliary combustion chamber in which fuel ignition takes place, in advance of fuel ignition of the combustion chamber as a whole, with various attendant advantages and with also the provision of a scavenging effect applied to said auxiliary combustion chamber which keeps it substantially clean and free from carbon.

A further object is to provide an engine which will operate more smoothly, with less consumption of gas, with less consumption of oil, and with longer life, as compared with engines now known to the art.

A further object is to provide a spark plug unit for an internal combustion engine in a combination such that injurious heating of the spark plug elements is minimized and the life of the spark plug thereby materially increased.

A further object is to provide an ignition unit for an internal combustion engine which in itself will provide a leaner mixture in the immediate vicinity of the spark electrodes than that in the main portion of the combustion chamber.

A further object is to materially increase the power output of an internal combustion engine as against a given fuel supply therefor.

A further object is to provide extended engine life, extended power and extended mileage due to the elimination or substantial minimization of pre-ignition.

A further object is to provide an engine in which compression may be simply adjusted for altitude and other changes.

A further object is to provide a construction in which compression may be adjusted equally on all cylinders, thereby doing away with the prejudicial effects of non-uniform compression of one or more cylinders.

A further object is to provide an engine in which the starting of the engine and a change to a power load may be accomplished more rapidly and more efficiently than heretofore.

A further object is to provide an engine in which the first ignition occurs in a mixture relatively lean as compared with the combustion chamber mixture, thereby accelerating, improving, and timing more efficiently the ignition in the combustion chamber as a whole.

A further object is to provide an ignition unit for an internal combustion engine which when installed in an ordinary engine will attain all of the objects recited above.

Other objects of the invention will in part be obvious and will in part appear hereinafter.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention reference should be had to the following detailed description taken in connection with the accompanying drawings, in which:

Fig. 1 is a diagrammatic view of a part of an internal combustion engine, showing a combustion chamber, intake and exhaust valves, with my improved spark plug unit, tapped into the top of the engine head, taking the place of the customary spark plug therein; this view shows elements of my spark plug unit in section with the spark plug carried thereby in side elevation;

Fig. 2 is a detail view of the inner plug element of the structure shown in Fig. 1 as it appears in side elevation;

Fig. 3 is a top plan view of the plug element of Fig. 2;

Fig. 4 is a detail view of one of the piston rings carried by the plug element of Fig. 2;

Fig. 5 is an assembly in side elevation of an ignition plug unit like that of Fig. 1 with certain changes, one of which involves outside fins to serve as an assistance in dissipation of heat generated during engine operation;

Fig. 6 is a view like Fig. 5 but showing the outside plug element in section;

Fig. 7 is a detail view showing this outside plug element in section;

Fig. 8 is a top plan view of a washer forming a part of the plug combination;

Fig. 9 is a sectional view of the washer of Fig. 8 on the line 9—9 of Fig. 8;

Fig. 10 is a sectional view of the inner plug shown in Fig. 6 removed from the outer plug;

Fig. 11 is a detail sectional view of the inner plug shown in Figs. 6 and 10 but with the electrode carried thereby removed;

Fig. 12 is a detailed view of the porcelain electrode;

Figure 13:
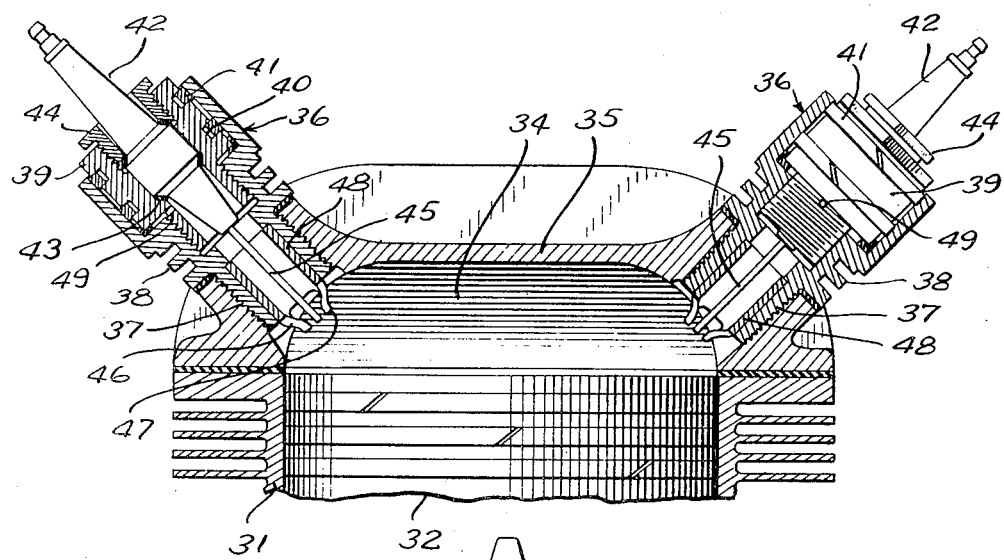
Fig. 13 is a diagrammatic view of a part of an internal combustion engine showing a combustion chamber with two spark plug units tapped into the engine head at angles, as shown, so as to provide a converging effect of the blow torch expulsion flame from the two auxiliary combustion chambers.

This invention is based as to some of its features upon the principles of the invention in my Patent No. 2,392,371.

Referring now first to Fig. 1, there is shown diagrammatically part of an engine head of an internal combustion engine marked A which encloses a combustion chamber B, an intake valve C and exhaust valve D, piston E and crank shaft F, all of customary and usual construction.

Tapped into the upper surface of this engine head at G is a hollow cylindrical plug H which has a main cylindrical part 1, tapered extension 2 extending as threaded part 3 bored out to provide the auxiliary combustion chamber 4 extending above the main combustion chamber B. Within the outer plug H there is mounted an inner or second plug 5 which comprises a main hollow cylindrical part 6, carrying piston rings 7 within piston ring grooves 8. The external dimension of the piston rings 7 carried by this inner plug as compared with the internal diameter of the outer plug H is such as to provide a limited relief passage between the two plugs extending from the main auxiliary combustion chamber B, through the auxiliary combustion chamber and then through this limited relief passage to the atmosphere. Such a limited relief passage is shown in my patent above referred to.

This inner plug 5 shown in top plan view in Fig. 3 is provided with slots 10 into which may be inserted a tool for rotating the inner plug, which carries outside threads at its upper end cooperating with inside threads upon the upper end of plug H, so that when turned its vertical position within the outer plug may be adjusted. This adjustment may be used to increase and decrease the combustion chamber space of the engine as a whole and thereby change the high compression ratio of the engine.

The drawings show only an ignition unit or units applied to a single cylinder but it will be understood that such plugs are to be applied to each cylinder of the engine and that the adjustment of the inner plug may be used to change the high compression ratio of any one cylinder without effecting the others, thereby compensating for any inequalities otherwise developed in operation, and providing an equal compression ratio on all the cylinders, theoretically desirable but difficult to provide in present internal combustion engines.

The advantages of this invention may be measurably attained by the use of a single plug tapped into the engine head or the housing of each combustion chamber, but in some instances good results can be obtained by the use of two plugs tapped into each combustion chamber at different points as shown in Fig. 13. The plugs may be either vertically disposed or at any desired angle.

Tapped into the inner plug 5 at 11, Fig. 1, is the lower end of a spark plug of standard construction as known to the art, comprising a porcelain element 12 and hexagonal part 13 by which the plug may be tool operated if necessary.

Fig. 1 shows the live electrode 14 extending down through the auxiliary combustion chamber to the upper end of the main combustion chamber and a ground electrode 15 carried by the outer plug H providing a proper gap between the two electrodes as shown.

While this extension of the live electrode and the ground electrode has certain advantages, it is permissible under certain conditions to use the ordinary association of live electrode 16 and ground electrode 17 shown in Fig. 6, and under other conditions it may be desirable to have the ignition gap set at various points along the auxiliary combustion chamber or extended even farther into the main combustion chamber.

The operation of the device as thus far described may now be understood.

The diameter of the piston rings 7 and the amount of relief provided by the relief passage there around is such that, during operation of the engine not causing detonation, the driving out of vapor through the relief passage is prevented but when conditions build up such that there would be detonation, relief is provided by the pressure upon the piston rings and sufficient relief to the outer air is provided to minimize or substantially eliminate the tendency to detonate which would otherwise occur.

This relief passage also has a second important function in that there is always a sufficient passage through the piston ring slots at their abutting ends to permit a slight flow of air from the outside at each suction stroke of the cylinder and there is thus provided a scavenging effect due to the air coming from the atmosphere passing down through the combustion chamber and tending to minimize the formation of carbon or foreign matter deposit within the auxiliary combustion chamber and around the electrodes whereby fouling of the electrodes and difficulty of operation is minimized if not entirely prevented.

This air flow has also an important advantage in adding to the life of the unit as a result of the cooling effect of the incoming air. During the suction stroke air is drawn into the passage and is compressed during the compression stroke and still further compressed during the power stroke. When the exhaust valve opens for the exhaust stroke the pressure in the main combustion chamber becomes suddenly less than that in the air passage and air will pass from the passage into the combustion space, producing a scavenging effect and thus cooling the auxiliary combustion chamber and the spark electrodes and preventing the formation of carbon or foreign matter deposit on these parts and therefore minimizing, if not entirely preventing, the fouling of these parts and the consequent impairment of operation.

The presence of this air passing into the combustion chamber also necessarily provides a leaner mixture in the auxiliary combustion chamber as compared with the mixture in the main combustion chamber and this has an important effect upon the operation of the engine as a whole.

When firing takes place at the point of the gap between the two electrodes this will necessarily take effect more quickly upon the material in the auxiliary compression chamber both because of its size and because the mixture there is leaner, and the fuel in the auxiliary combustion chamber accordingly, substantially as a whole, will blow out into the main combustion chamber as with a blow-torch effect thereby providing greatly accelerated and substantially instantaneous combustion of the entire fuel charge with important results which will be obvious to those skilled in this art.

Exhaustive tests have established that with the combination shown there is a practically complete and instantaneous combustion at the time necessary to insure smooth and efficient operation of the engine in that the combustion may be timed at the proper point just before the working piston has reached the top of its stroke and is prepared to return for its power stroke. There is thus eliminated the all-too-familiar evils of pre-ignition, detonation, and wear and tear upon the engine as a whole, due to improper timing of its action. From another standpoint it may be said that I have such an acceleration of flame propagation as practically to eliminate carbon formation and also permit the use of much leaner fuel mixtures.

We have thus seen that this construction accomplishes all the objects set forth hereinabove and has as well valuable additional features, the importance of which will be well understood by anyone familiar with the art upon noting the operation of this ignition unit.

We turn now to the modified structures shown in Figs. 5 to 12. I have here shown an outer plug 20 similar to the outer plug H of Fig. 1 but provided with fins 21 which aid in dissipation of heat. This outer plug, as is shown in Figs. 5 and 6, has its upper end formed in hexagonal or other shape which will permit tool operation. At its lower end it is first reduced in diameter at 22 and again reduced in diameter and threaded at 23 so that it may screw into the spark plug opening of any ordinary engine in a way similar to the unit of Fig. 1.

Within this outer plug 20 is carried an inner plug 24 (Fig. 6) which carries piston rings 25 of diameter such as to provide a relief passage between such rings and the inner surface of the outer plug functioning like the relief passage shown in Fig. 1 already described.

This inner plug with its central porcelain spark plug 26 is shown in section in Fig. 10 and in section in Fig. 11 with the porcelain spark plug removed. Its upper end at 27 is hexagonal to allow for tool insertion and removal. As shown in Fig. 6 below this inner plug is located a by-pass washer 28.

In these views the relief passage to minimize detonation passes up through the auxiliary combustion chamber along the side of the lower end of the spark plug 26, through an opening 29 in the threaded plug toward the lower end of the plug 24 as indicated, through the central opening of the by-pass washer 28 which may be made of copper, through the cut away portions 30 thereof to the relief passage between the inner and outer plugs. With this unit, as before, the ignition gap may be located as desired at the lower end of the spark plug as shown, or at any point lower than this and into the combustion chamber.

The air passage, to provide for scavenging effect and to make the mixture in the auxiliary piston chamber leaner, will, as shown in Fig. 6, have a circuitous route between the lower abutting point of the piston ring ends, then around and on until it strikes the upper abutting point as shown in Fig. 6, the communication being with the atmosphere at the upper end and with the auxiliary combustion chamber at the lower end.

An advantage of the structure shown in Figs. 5 and 6 is that it is installed by one operation, has certain advantages of compactness, cheapness, and otherwise, which are important from the standpoint of manufacture and of efficiency but which need not be further pointed out in this specification.

The ignition unit here shown may quite properly be called an octane regulator in that by minimizing detonation and properly accelerating and timing combustion it enables fuel of comparatively low octane rating to show the same results as the high octane fuels now thought to provide major advantages.

In an internal combustion engine such as here shown it has been established by tests that not only various lower octane grades of gasoline may be used with greatly improved results but also alcohol, kerosene and other low gravity fuels may be used without change in the engine and smooth, efficient engine operation is obtained with these hereto difficult fuels.

Fig. 13 shows a cylinder 31, a working piston 32, a main combustion chamber 34, and engine head 35.

Into this engine head 35 are tapped two similar spark plug units, the angle preferably being such that a line drawn in extension of the live electrodes would meet within the combustion chamber.

Each of these spark plug units has an outer plug 36 threaded at its lower end at 37 where it is screwed into the engine head 35 and provided midway of its outer length with a fin 38 for the dissipation of heat. Carried within this outer plug is an inner plug 39 provided with grooves 40 carrying piston rings 41 providing both a relief passage and air passage as already described. This inner plug carries porcelain electrode 42 held in place by gasket 43 and nut 44 and provided with an extended live electrode 45 cooperating as shown with two ground electrodes 46 and 47, projecting from the end of the cylindrical bushing 48 carried by driving fit within the lower end of outer plug 36.

With this unit the relief passage extends up through the auxiliary combustion chamber, through the inner plug 39, out through opening 49, then up around past the piston rings when these are reduced in diameter by pressure upon them, and with a constant slight circuitous air passage through the abutting ends of the piston rings, as already described.

An advantage of the structure shown resides in the fact that a heat expansion effect is provided as between the bushing 48 carrying the ground electrodes, the lower end of the outer plug 36 and the adjoining material of the engine head 35, which will tend to anchor the spark plug unit in place and prevent its being loosened by vibration or otherwise. As for example, in the view shown, if the engine head is of iron the outer plug of aluminum and the ground electrode bushing of a substance such as Monel metal, the unequal expansion of the aluminum under heat will tend to anchor the spark plug securely in position and this provides an important and useful function of the construction described.

Figure 15:
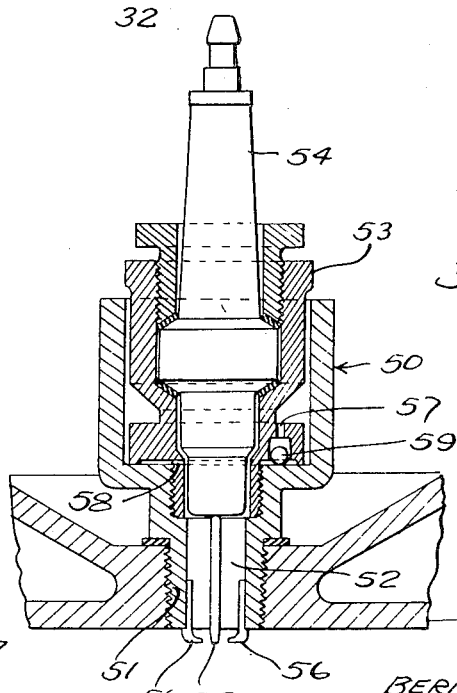
Fig. 15 is a view partly in section of a further modification of the ignition unit shown in the preceding views.
Figure 14:
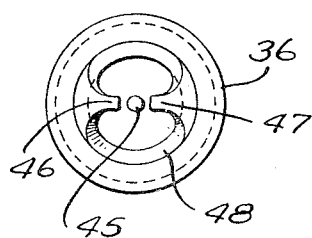
Fig. 14 is a detail in bottom plan elevation of one of the spark plug units shown in Fig. 13.

Fig. 15 shows another means for controlling the inflow of air from the atmosphere to the auxiliary combustion chamber with the results and advantages already detailed. In this view the outer plug 50 is threaded at 51 so that it may be screwed into the spark plug opening of any internal combustion engine. An auxiliary combustion chamber 52 is provided as before. Within the outer plug member is carried an inner plug 53 and this carries a porcelain member 54 of ordinary construction, save that the live electrode 55 is shown as extending down through the auxiliary combustion chamber to a point where the gap between the live electrode and the ground electrodes 56 will come just below the auxiliary combustion chamber and accordingly just within the main combustion chamber. The inner plug 53 is reduced in diameter as compared with the outer plug. The air communication from the atmosphere to the auxiliary combustion chamber is provided as shown around the inner plug through an opening 57 at the right of the view in Fig. 15, then around the inner plug to the opening 58, and thence down to the auxiliary combustion chamber, thus providing a circuitous passageway. The opening 57 at the right of Fig. 15 is shown as closed by a ball 59.

In operation with this type of ignition plug, pressure upon the upstroke of the power piston or from the explosion during the power stroke will force the ball 59 upward closing the air passage and preventing any loss of power. Upon the suction stroke of the power piston, however, air will flow down through the limited passage provided, displacing the ball from its seat and providing both a scavenging and a cooling effect and a leaner mixture in the auxiliary combustion chamber as compared with the main combustion chamber.

I prefer the construction shown in which the passage from the auxiliary combustion chamber is at the left of the plug as shown, out through the by-pass opening 58 so that the combustion vapors must pass out at one side of the plug and then around the plug before they come in contact with the ball 59. Such combustion vapors lose a considerable part of their heat and it is found that the ball is not materially affected thereby. This circuitous passage has the further advantage, as explained in connection with the other modifications, of permitting relatively fresh air to be compressed therein during the power stroke whereupon it passes out into the auxiliary combustion chamber when the pressure is released for the exhaust stroke, thus aiding in flushing the cylinder of burned gases and cleaning the interior of the auxiliary combustion chamber and the sparking electrodes.

I have found the ball valve as shown useful and efficient in this relation but a flap valve or other form of one-way passage control may be substituted therefor and if the communication passageway to the atmosphere is made sufficiently small useful results may be obtained with the unit as shown omitting entirely the ball valve 59 or any substitute therefor and leaving the air passage accordingly open at all times. Under these conditions a small loss of power will result but other objects of the combination will be substantially and usefully attained.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention what I claim as new and desire to secure by Letters Patent is:

1. In an internal combustion engine, a combustion chamber, a power cylinder, a piston operative therein and operatively connected to the engine crank shaft, means for controlling the intake and exhaust of fuel, an opening through the engine housing to the combustion chamber, a spark plug fitting in said opening, an auxiliary combustion chamber between the combustion chamber and the spark plug, a passageway from said auxiliary combustion chamber providing a limited flow of air to the auxiliary combustion chamber.

2. In an internal combustion engine, a combustion chamber, a power cylinder, a piston operative therein and operatively connected to the engine crank shaft, means for controlling the intake and exhaust of fuel, an opening through the engine head to the combustion chamber, a spark plug fitting in said opening, an insulator centrally disposed in said spark plug, an auxiliary combustion chamber above the main combustion chamber between the combustion chamber and the spark plug, a passageway opening from said auxiliary combustion chamber providing a limited flow of air to the auxiliary combustion chamber upon the suction stroke of the power piston, said spark plug having a live electrode carried by said insulator extending through the auxiliary combustion chamber toward and into the main combustion chamber, and having a ground electrode associated with the live electrode.

3. In an internal combustion engine, a combustion chamber, a power cylinder, a piston operative therein and operatively connected to the engine crank shaft, means for controlling the intake and exhaust of fuel, an opening through the engine housing to the combustion chamber, a spark plug fitting in said opening, a passageway from the combustion chamber through said opening providing a relief passage, non-operative during normal operation of the engine but operating to relieve pressure and thereby minimize detonation, and heat dissipation fins on the outer face of said plug.

4. In an internal combustion engine, a combustion chamber, a power cylinder, a piston operative therein and operatively connected to the engine crank shaft, means for controlling the intake and exhaust of fuel, an opening through the engine head to the combustion chamber, a spark plug fitting in said opening, an auxiliary combustion chamber above the main combustion chamber between the combustion chamber and the spark plug, a passageway from said auxiliary combustion chamber providing a relief passage, non-operative during normal operation of the engine but operating to relieve pressure and thereby minimize detonation, and heat dissipation fins on the outer face of said plug.

5. In an internal combustion engine, a combustion chamber, a power cylinder, a piston operative therein, an opening through the engine head to the combustion chamber, a plug fitting in said opening, an inner plug carried within said first plug, a piston ring carried by said inner plug, said piston ring having abutting ends and being of diameter such that it will yield slightly under pressure to provide a relief passage from the combustion chamber when pressure therein is so great as to cause detonation.

6. In an internal combustion engine, a combustion chamber, a power cylinder, a piston operative therein, an opening through the engine head to the combustion chamber, a plug fitting in said opening, an inner plug carried within said first plug, a piston ring carried by said inner plug, said piston ring having abutting ends and being of diameter such that it will yield slightly under pressure to provide a relief passage from the combustion chamber when pressure therein is so great as to cause detonation, the space between the abutting ends of said piston ring providing a constant slight air passage between the combustion chamber and the outer air.

7. In an internal combustion engine, a combustion chamber, a power cylinder, a piston operative therein, an opening through the engine head to the combustion chamber, a plug fitting in said opening, an inner plug carried within said first plug, a plurality of piston rings carried by said inner plug, said piston rings having abutting ends and being of diameter such that they will yield slightly under pressure to provide relief passages from the combustion chamber when pressure therein is so great as to cause detonation.

8. In an internal combustion engine, a combustion chamber, a power cylinder, a piston operative therein, an opening through the engine head to the combustion chamber, a plug fitting in said opening, an inner plug carried within said first plug, a plurality of piston rings carried by said inner plug, said piston rings having abutting ends and being of diameter such that they will yield slightly under pressure to provide relief passages from the combustion chamber when pressure therein is so great as to cause detonation, the spaces between the abutting ends of said piston rings providing a constant slight air passage between the combustion chamber and the outer air.

9. An ignition unit comprising a member, a chamber opening outwardly at one end of said member, an electrode carrier within said member and at least partially within said chamber, and a circuitous passageway including the space surrounding a portion of said carrier from said chamber through said member, at least a portion of said passageway having an extremely small cross section.

10. An ignition unit comprising a tubular member, a chamber opening outwardly at one end of said tubular member, an electrode carrying member within said tubular member, electrodes forming an ignition spark gap at the lower end of said chamber, and a passageway including the space around a portion of said electrode carrying member from said chamber through said unit, at least a portion of said passageway having an extremely small cross section.

11. An ignition unit comprising a tubular member, a chamber opening outwardly at one end of said tubular member, an electrode carrying member within said tubular member, electrodes forming an ignition spark gap at the lower end of said chamber, and a circuitous passageway including the space around a portion of said electrode carrying member from said chamber through said unit, at least a portion of said passageway having an extremely small cross section.

12. A spark plug comprising a tubular member, sparking electrodes at one end of said member, a terminal at the other end of said member, electrically connected to one of said electrodes, insulating means within said member, insulating said member from said terminal and the electrode connected thereto and closing said tubular member, and a passageway including the space around a portion of said insulating means through said spark plug within said member, at least a portion of said passageway having an extremely small cross section.

13. A spark plug comprising a tubular member, sparking electrodes at one end of said member, a terminal at the other end of said member, electrically connected to one of said electrodes, insulating means within said member, insulating said member from said terminal and the electrode connected thereto and closing said tubular member, and a circuitous passageway including the space around a portion of said insulating means through said spark plug within said member, at least a portion of said passageway having an extremely small cross section.

14. An ignition unit comprising a tubular member having a chamber therein open at one end, a sleeve surrounding said member substantially throughout the length thereof and spaced therefrom so as to form an annular passage for air therebetween, and a passageway from said chamber to said annular passage.

15. An ignition unit, as defined in claim 14, in which the annular passage is small enough to prevent the passage of gases except under pressures which would normally cause detonation in the cylinder with which the ignition unit is to be used.

16. An ignition unit, as defined in claim 15, in which the annular passage is closed adjacent the chamber and the passageway leads from the chamber to the annular passage at the closed end thereof.

17. An ignition unit, as defined in claim 16, in which the annular passage is provided with spaced piston rings in contact with both the tubular member and the sleeve.

BERNARD C. FISHER.

REFERENCES CITED

The following references are of record in the file of this patent:

UNITED STATES PATENTS

| Number | Name | Date |
| --- | --- | --- |
| 656,020 | Hautier | Aug. 14, 1900 |
| 960,752 | White | June 7, 1910 |
| 1,218,215 | Schlundt | Mar. 6, 1917 |
| 1,492,007 | Wayte | Apr. 29, 1924 |
| 1,555,718 | Schroeder | Sept. 29, 1925 |
| 1,568,638 | Summers | Jan. 5, 1926 |
| 2,392,371 | Fisher | Jan. 8, 1946 |